United States Patent
Hoff et al.

(10) Patent No.: US 7,162,876 B2
(45) Date of Patent: Jan. 16, 2007

(54) EJECTOR FOR COOLING AIR SUPPLY PRESSURE OPTIMIZATION

(75) Inventors: Richard W. Hoff, Glastonbury, CT (US); James P. Chrisikos, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/398,097

(22) Filed: Apr. 5, 2006

(65) Prior Publication Data

US 2006/0179847 A1    Aug. 17, 2006

Related U.S. Application Data

(62) Division of application No. 10/678,877, filed on Oct. 3, 2003.

(51) Int. Cl.
*F02C 7/12* (2006.01)
*F02C 7/28* (2006.01)

(52) U.S. Cl. .......................................... 60/785; 60/806
(58) Field of Classification Search .................. 60/784, 60/785, 802, 806; 415/115, 116, 117, 176
See application file for complete search history.

(56) References Cited

U.S. PATENT DOCUMENTS

| 4,182,117 | A | * | 1/1980 | Exley et al. | ................... | 60/785 |
| 4,752,185 | A | * | 6/1988 | Butler et al. | ................. | 416/116 |
| 5,287,694 | A | * | 2/1994 | Davis et al. | ................... | 60/785 |
| 6,550,253 | B1 | * | 4/2003 | Mortzheim et al. | ........... | 60/806 |

* cited by examiner

Primary Examiner—L. J. Casaregola
(74) Attorney, Agent, or Firm—Bachman & LaPointe

(57) ABSTRACT

A system for optimizing cooling air supply pressure includes a high pressure fluid source which receives bleed air from the exit of a high pressure compressor and a nozzle and ejector assembly for supplying fluid to a point of use at a pressure sufficient to maintain a required cooling airflow and backflow margin at the point of use, and for reducing leakage of the cooling fluid between the high pressure source and the point of use.

3 Claims, 1 Drawing Sheet

EJECTOR FOR COOLING AIR SUPPLY PRESSURE OPTIMIZATION

CROSS-REFERENCE TO RELATED APPLICATION(S)

This application is a divisional application of U.S. patent application Ser. No. 10/678,877, filed Oct. 3, 2003, entitled EJECTOR FOR COOLING AIR SUPPLY PRESSURE OPTIMIZATION, By Richard W. Hoff et al.

BACKGROUND OF THE INVENTION

The present invention relates to gas turbine engines and more particularly to an improved system for reducing leakage of fluid and for providing fluid at a desired pressure to a point of use Air is bled from the high pressure compressor and used to cool various engine components including a blade outer air seal assembly in the high pressure turbine section of the engine. In the past, there has been substantial pressure losses in this cooling air due to leakage. As a result of these losses, it has been difficult to maintain the required cooling levels and the desired back flow margin at the blade outer air seal assembly.

SUMMARY OF THE INVENTION

Accordingly, it is an object of the present invention to provide an improved system for delivering cooling air to a blade outer air seal assembly.

It is a further object of the present invention to provide an improved system as above which reduces pressure losses due to leakage.

The foregoing objects are attained by the system of the present invention.

In accordance with the present invention, a system for optimizing cooling air supply pressure is provided. The system of the present invention broadly comprises a high pressure fluid source; means for supplying fluid to a point of use at a pressure sufficient to maintain a required cooling airflow and backflow margin at the point of use; and the fluid supplying means further comprising means for reducing leakage of the fluid between the high pressure source and the point of use. In a preferred embodiment of the present invention, the fluid supply means includes at least one nozzle which communicates with the high pressure fluid source and at least one ejector for delivering cooling fluid at the proper pressure to the point of use.

Other details of the ejector for cooling air supply pressure optimization, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
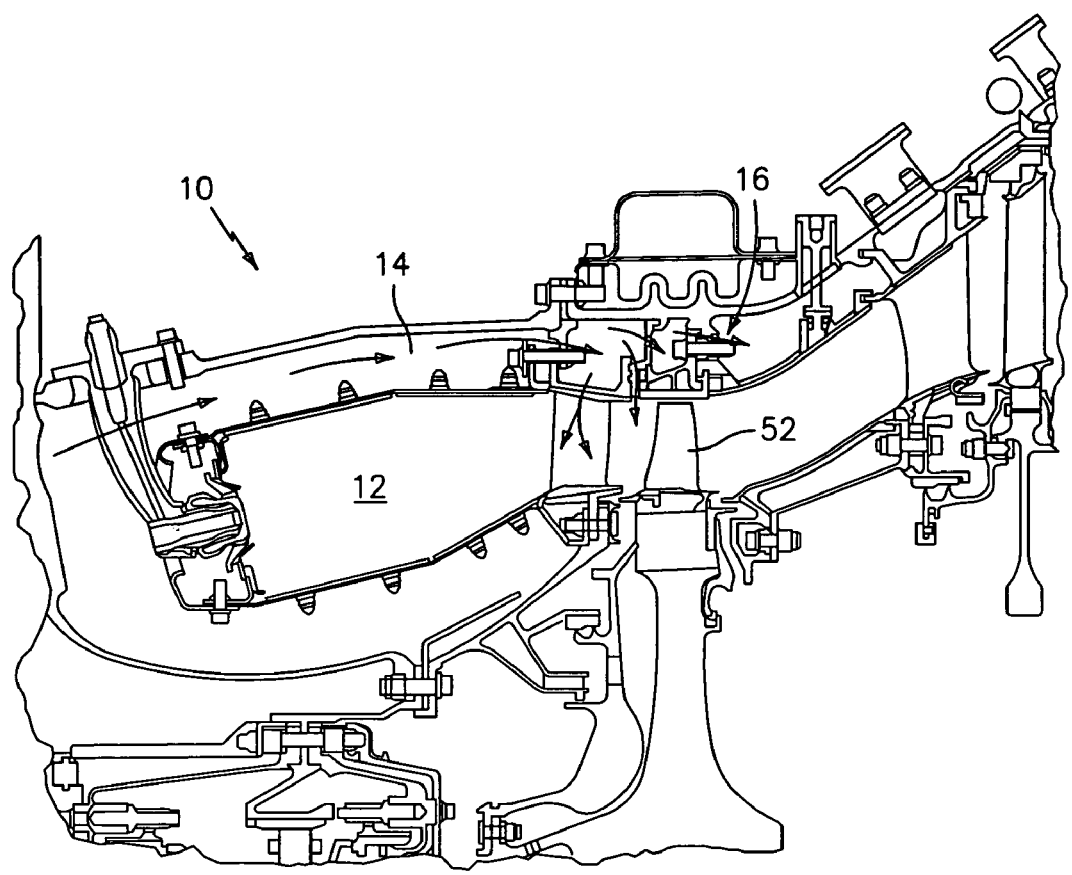
FIG. 1 is an illustration of a portion of a gas turbine engine containing the system for optimizing cooling air supply pressure of the present invention.

Referring now to FIG. 1, a gas turbine engine 10 has a combustor 12 and a fluid passageway 14 for conducting air bled from a high pressure compressor (not shown). The bleed air is used to supply cooling air to a blade outer air seal assembly 16. In the past, it has been difficult to supply the cooling air to the seal assembly 16 at a desired pressure. This is due to a leakage which occurs at a location 18 between the chamber 34 forming a high pressure fluid source and a plenum 19 which provides cooling air to the seal assembly 16.

In accordance with the present invention, a system 30 for optimizing the pressure of the cooling air supplied to the blade outer air seal assembly 16 is provided. The system 30 includes an inlet 32 for allowing high pressure bleed air from the high pressure compressor flowing through the passageway 14 to enter the chamber 34 which acts as the high pressure fluid source. The pressure within the chamber 34 approximately equals of the pressure at the exit of the high pressure compressor. Opposite the inlet is a nozzle 36 which is sized to create a desired flow of cooling air exiting the chamber 34 at a desired rate. The nozzle 36 is positioned within a diaphragm 37 which forms at least one wall of the chamber 34.

Figure 2:
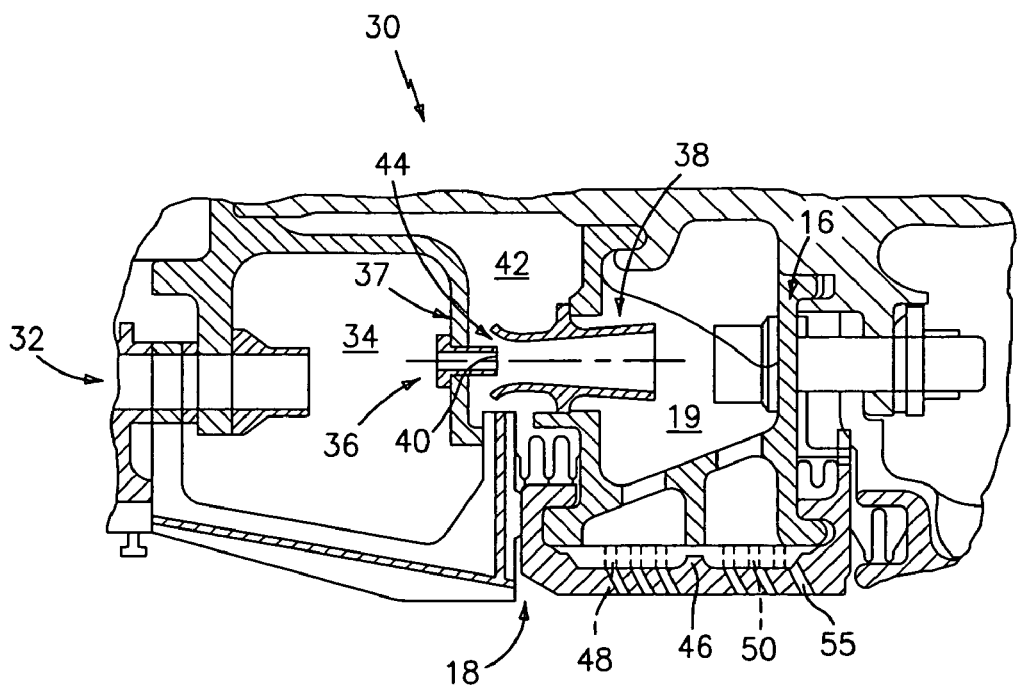
FIG. 2 is an enlarged view of the system for optimizing cooling air supply pressure in accordance with the present invention.

As can be seen from FIG. 2, an ejector 38 is aligned with the outlet 40 of the nozzle 36. A cavity 42 surrounds the outlet 40 of the nozzle 36 and the inlet 44 of the ejector 38. The pressure of the cooling air within the cavity 42 is approximately 75% of the pressure in plenum 19 and equivalent to the pressure at location 18. By reducing the pressure in cavity 42 to that at location 18, leakage at location 18 is eliminated. In order to deliver cooling air at an appropriate pressure, to the plenum 19 and the blade outer air seal 46, air is supplied to the inlet 44 of the ejector 38 by the nozzle 36. Since the static pressure at the inlet 44 is lower than the pressure in the cavity 42, air within the cavity 42 is drawn into the ejector 38. This reduces the leakage of air through the location 18 between the supply source chamber 34 and the plenum 19. The pressure of the cooling air being delivered to the blade outer air seal 46 is increased to the desired level by sizing the ejector 38 to increase the pressure of the air being delivered to the plenum 19.

The cooling air which is delivered to the blade outer air seal 46, via the plenum 19, flows through a series of impingement holes 48 onto an outer surface 50 of the seal 46 and then discharges through cooling holes 55 in seal 46. It is important to deliver the cooling air at the correct pressure so as to maintain the back flow margin (the difference in the pressure on the inner and outer surfaces 54 and 50 respectively of the seal 46) so that the cooling air flows through the holes 55 in seal 46.

The system of the present invention optimizes the pressure drop, cooling air supply pressure, and down stream leakage between the cooling air supply chamber 34 and the pressurized plenum 19, which delivers the cooling air to the blade outer air seal 46. The result is maintaining the required cooling airflow and back flow margin at the blade outer air seal 46 while reducing the leakage to below the level of a system that does not include the ejector 38.

While only one nozzle 34 and one ejector 38 have been illustrated, the system actually has a number of nozzles 34 and a number of aligned ejectors 38 around the circumference of the engine.

It is apparent that there has been provided in accordance with the present invention an ejector for cooling air supply pressure optimization which fully satisfies the objects, means, and advantages set forth hereinbefore. While the present invention has been described in the context of specific embodiments thereof, other alternatives, modifications and variations will become apparent to those skilled in the art having read the foregoing description. Accordingly, it is intended to embrace those alternatives, modifications, and variation as fall within the broad scope of the appended claims.

What is claimed is:

1. A gas turbine engine comprising:
a turbine blade;
a blade outer air seal adjacent said turbine blade;
a chamber containing air bled from a high pressure compressor; and
a nozzle and ejector assembly for delivering air from said chamber at a pressure sufficient to maintain a cooling air flow through said blade outer seal and a back flow margin across said blade outer seal,
wherein said nozzle and ejector assembly delivers cooling air at said sufficient pressure to a plenum which communicates with an outer surface of said blade outer seal.

2. A gas turbine engine according to claim 1, wherein said blade outer seal has a plurality of holes through which cooling air from said plenum flows onto an inner surface of said blade outer seal and a tip of said turbine blade.

3. A gas turbine engine according to claim 1, wherein said nozzle and ejector assembly reduces leakage of cooling fluid between said chamber and said plenum.

* * * * *